Feb. 5, 1952     H. W. LINDENMUTH     2,584,477
AUTOMOBILE SELF-STARTER WITH SAFETY CUTOUT
Filed May 8, 1948                               2 SHEETS—SHEET 2
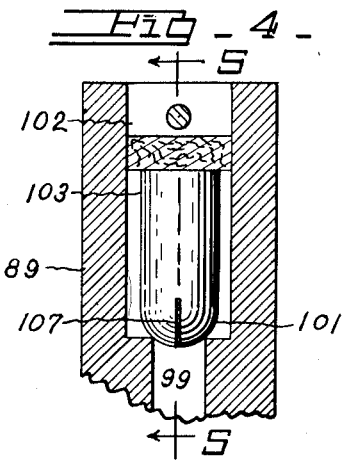
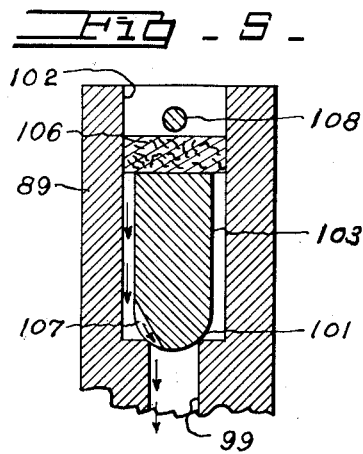
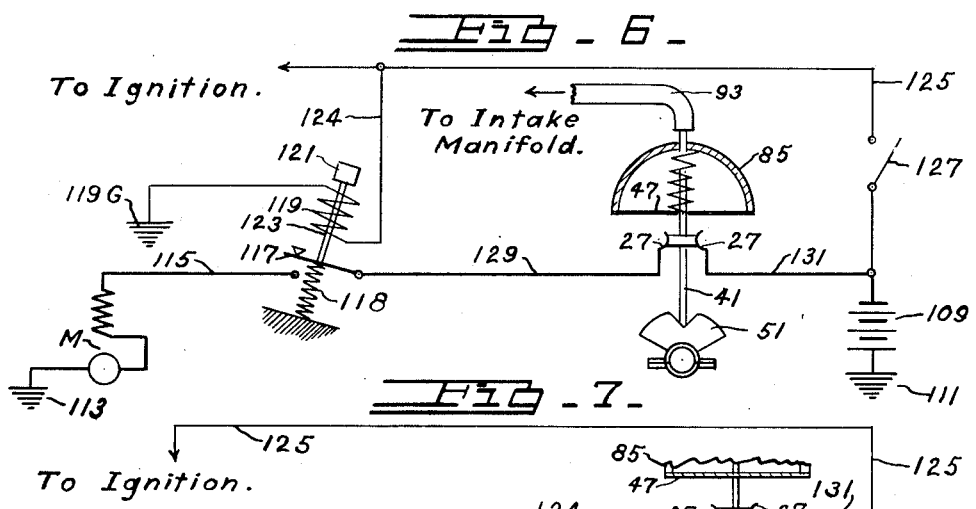
INVENTOR
*HENRY W. LINDENMUTH*
BY   *H. V. Hicks*
ATTORNEY Patented Feb. 5, 1952

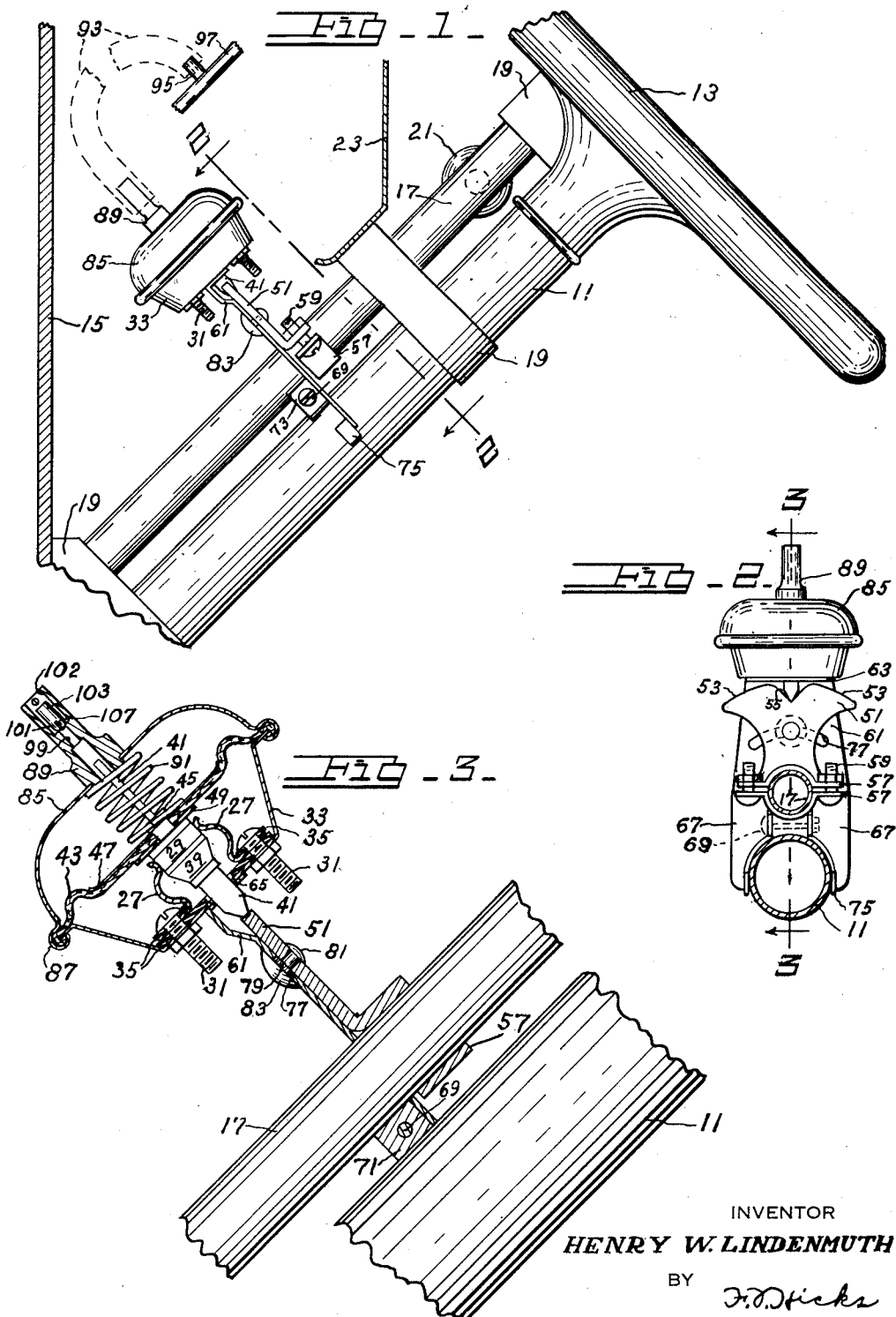

2,584,477

UNITED STATES PATENT OFFICE 2,584,477

AUTOMOBILE SELF-STARTER WITH SAFETY CUTOUT

Henry W. Lindenmuth, Dearborn, Mich., assignor to Auto-Go, Incorporated, a corporation of Michigan Application May 8, 1948, Serial No. 25,817

4 Claims. (Cl. 200—59)

The invention pertains to automobile engine starting systems and more particularly to a starter safety arrangement for eliminating the danger that an automobile starter might be operated when the gears of the automobile are in mesh, or when the engine is already in operation.

While the invention is especially advantageous for use with automatic self-starting systems on automobiles, it will be understood that the invention may also be usefully applied to any automobile starting system which utilizes an electric motor for cranking an internal combustion engine.

It is an object of the invention to provide an improved automobile safety arrangement which is convenient to apply for eliminating the danger that the conventional self-starter may be actuated to start the engine of an automobile while the gears are in mesh or while the engine is running, and which is simple to manufacture and install, and which is rugged and reliable in operation.

It is also an object of the invention to provide such a self-starter safety arrangement which will be especially advantageous for use on automobiles having the conventional steering column mounted gear shifters.

It is a further object of my invention to provide a safety starter switch which can be conveniently installed upon automobiles.

Another object of my invention is to provide an improved slow bleeding check valve for use in such safety starter control switches, and a method for making such valves.

Further objects and advantages are within the scope of my invention, such as relate to the arrangement, operation and function of the related elements of the structure, to various details of construction and to combinations of parts, elements per se, and to economies of manufacture and numerous other features as will be apparent from a consideration of the specification in conjunction with the drawings disclosing specific embodiments of the invention, in which:

Fig. 1 is a side elevational view, partially sectioned and showing a portion of an automobile having a conventional steering column gear shifter;

Fig. 2 is a cross-sectional view on line 2—2 in Fig. 1;

Fig. 3 is an enlarged cross-sectional view on line 3—3 in Fig. 2;

Fig. 4 is a sectional view showing the slow bleeding check valve in the connection fitting, similarly to Fig. 3 but greatly enlarged and fragmentary;

Fig. 5 is a sectional view on line 5—5 on Fig. 4, diagrammatically representing the slow reverse flow action of the valve, Fig. 6 is a schematic view diagrammatically representing how the safety switch of the present invention may be connected into the self-starter circuit of an auomobile; and Fig. 7 is a similar view illustrating another starter system wherein my starter safety control switch may be utilized for holding the automobile self-starter circuit open and inoperative at times when it should not be operated.

Referring more specifically to Figs. 1, 2 and 3 of the drawings, it will be seen that I have illustratively disclosed an embodiment of my invention as installed upon a conventional automobile embodying a usual steering column 11 enclosing a shaft (not shown) which has a steering wheel 13 upon the upper end and the lower end of the steering column and shaft passing down and forwardly through the front panel 15 of the passenger compartment of the automobile, for operative connection with the front wheels through conventional connecting elements (not shown) in any well known manner.

Also I have represented a well known type of steering column gear shifter embodying a rotative gear shifter 17 and which is mounted parallel to and slightly spaced from the steering column, and rotatively supported as through supports 19, in any conventional manner. Such a gear shifter 17 commonly has a handle 21 projecting laterally and conveniently disposed under the steering wheel for shifting the automobile gears, in a well known manner, by a combination of rotary and axial movements imparted to the shifter 17, and transmitted to the gears through conventional linkages, not shown. 23 represents the usual instrument board.

In accordance with my invention, I provide a starter circuit safety switch comprising a pair of electrical contacts 27 mounted in spaced apart relation to be connected together by a bridging contact 29 for completing the starter circuit, or a starter control circuit, only when conditions are such that it is safe to use the starter to start the automobile engine, as will be subsequently described in detail.

The two spaced apart electrical contacts 27 are made of good conductive metal and conformed to have suitable resilience to make a good wiping contact upon the bridging contact, when the latter is moved therebetween. The size and weight of these contacts may be varied to suit the magnitude of the current to be controlled, which may be only sufficient to control a relay or electromagnetic switch, or it may control the starter motor current directly, as desired. The two contacts 27 are secured, and conductive connection is extended therefrom, by means of screws 31 passing through larger apertures in the bottom of a bowl shaped switch casing 33 which may be made of sheet metal. Suitable spacer washers 35, of fiber or other insulation material, are inserted to insulate these screws and the contacts from the casing, as these are clamped snug by nuts 37, in a manner common with electrical apparatus. The outer extended ends of the screws 31 provide convenient electrical terminals for securing the ends of connection wires or cables, in a well known manner.

The bridging contact 29 of the starter safety switch is tubular in form and of suitable conductive metal. It is mounted upon a sleeve 39 of any suitable insulation material carried on an actuator 41 of a pin or rod-like form. The upper end of the actuator 41 is of a substantially reduced diameter passed up through a central aperture in a flexible diaphragm 43 and externally threaded to receive a clamping nut 45 thereon. To apply pressure or force uniformly upon the diaphragm without undue concentration causing injury thereto, it is preferable to provide a centrally apertured pressure plate 47 on top of the diaphragm and under the clamping nut, the outer edges of the pressure plate being turned or dished upwardly. For a similar purpose, a fiber washer 49 is preferably disposed on the actuator rod under the diaphragm.

The lower end of the actuator 41 projects down and passes freely out through an aperture centrally in the bottom of the switch casing. The externally projecting end of the actuator is preferably rounded for freely and smoothly engaging and passing over a cam 51 carried on and rotated by the rotative gear shifter 17. The outer camming edge surface of this cam consists of two portions 53 formed substantially arcuate around the axis of rotation of the rotative gear shifter, and having an intermediate depression 55 therein. The portion of this cam inward from the arcuate cam surface is conformed to be clamped upon the tubular gear shifter member 17, as by a clamp piece 57 drawn thereto by screws 59. The actuator cam may be made of any suitable material, although it may be conveniently stamped and shaped out of heavy guage sheet metal.

To conveniently mount the switch casing in a suitable position in a non-rotative and slidable relation adjacent the steering column 11 and the gear shifter tube 17, I provide a sheet metal bracket 61, the upper end of which is turned to provide an attachment flange 63, which is conveniently attached to the bottom of the casing by welding, or in any suitable manner. This attachment flange 63 also has a suitable aperture 65 for freely passing the projecting end of the actuator 41. The sheet metal bracket is stamped out to a generally U-shape having spaced legs 67 suitable to pass over the rotative gear shifter 17 and to engage the sides of the steering column 11. A bolt 69 is passed through the spaced legs 67 of the bracket in the space between the steering column and the rotative gear shifter, and it serves to hold the bracket freely in position. A spacer block 71 may also be inserted in this space between the steering column 11 and the gear shifter 17, and when so provided, this block is suitably apertured so that the bolt also passes through it. In stamping out this U-shaped bracket, bolt receiving lugs 73 are provided which are bent laterally to the plane of the bracket for passing the bolt 69 therethrough as it is inserted between the column and the shifter. Likewise, end contact tabs or lugs 75 are formed for engaging the sides of the steering column 11.

The U-shaped mounting bracket is also provided with a curved slot 77 of substantially an arcuate shape for freely receiving a pin 79 having a reduced portion passing snugly through a suitable aperture in the cam 51 and peened to provide a head 81 attaching the pin firmly in the cam. The other or large end of this pin 79 passes freely and loosely through the slot 77 in the bracket and has a larger head 83 which holds it in the bracket but which is loose and free to swing back and forth on the slot. This arrangement assures that the switch casing, the bracket and the cam will be installed and maintained in proper cooperative positions. The actuator 41 projecting from the bottom of the switch casing is made of suitable length so that while engaged by the two raised arcuate portions of the cam surface the bridging contact will be held away from the spaced contacts 27, and when the actuator 41 is in the depressed area of the cam the spaced switch contacts are bridged.

The diaphragm 43 is made of any suitable flexible sheet material such as a fabric coated or impregnated with rubber, synthetic rubber or other compounds, or even of a thin sheet metal if preferred, and its edges preferably extend beyond the outwardly extending upper edges of the casing. A sheet metal cover 85 is provided thereon, which is of an inverted bowl shape having edges 87 projecting outwardly still further, so that these edges may be turned down around the edges of the casing for securing the cover thereon and at the same time clamping the edges of the diaphragm therebetween in a hermetically sealed tight relation. The upper portion of the cover 85 is centrally apertured to receive a reduced portion of a connection fitting and valve body 89 peened for snug attachment therein. A compression spring 91 is disposed centrally upon the upper side of the diaphragm to press it down for holding the actuator 41 in engagement with the cam and for moving the bridging contact to bridge the switch contacts 27 when the actuator passes into the intermediate depressed area of the cam.

The upper end of the connection fitting 89 is suitably conformed to be inserted into the end of a rubber tube 93 (represented by dotted lines) which extends to a connection fitting 95 disposed in the windshield wiper line 97 from connection into the intake manifold. An aperture 99 is provided through the connection fitting 89 on the cover so that, when the engine of the automobile is running, a partial vacuum is produced in the cover enclosed space over the upper side of the diaphragm. The bottom of the casing being open to atmosphere through the aperture around the actuator 41, the diaphragm is caused to flex upwardly and this lifts the bridging contact away from the spaced switch contacts 27, so long as the engine is running.

To avoid sudden closing of the safety switch, if the partial vacuum should fail for a brief interval, I provide a slow bleeding check valve 101 in the connection fixture. This valve is readily seated on a seat formed by providing an enlarged counterbore 102 down into the upper end of the aperture in the connection fixture 89, where its proper seating is predetermined by the guiding effect of its elongated valve stem 103. To provide for slow bleeding of the valve it is cut across, as by a thin saw, to provide a narrow recess 107 across the seating bottom end, as may be more clearly seen in Figs. 4 and 5. A retaining pin 108 is provided transversely in the upper end of the fitting 89 for holding the valve therein. Above the valve and under the pin, a piece of sponge rubber, wool felt 106, or like material, is preferably inserted to hold the valve and prevent it chattering or vibrating. When the valve is seated, the narrow slot 107 in the valve provides for a slow reverse flow or bleeding, as represented by the arrows in Fig. 5. This permits my starter safety switch to close in a predetermined time interval after the engine stops, but prevents it closing instantly. Due to the shape of the movable bridging member 29 and still further due to the frictional gripping action of opposed contacts 27 thereon, this contact is held until a considerable operating force has built up and then it moves to close the circuit with a quick snappy action. Also movement to open the circuit is held up by the frictional gripping action of the contacts 27 on the bridging contact 29. Then when it moves the movement is a quick snappy movement because moving friction is less than friction at rest.

Fig. 6 diagrammatically illustrates one type of installation which is conveniently completed by merely inserting my safety starter switch directly into the circuit of the electric starter motor M. In the usual automobile self-starter systems, the battery 109 of the automobile supplies the electrical energy to operate an electric motor M which turns the engine over. To simplify connections, it is common to ground one terminal of the battery on the frame, as represented at 111, and one terminal of the motor M is also grounded, as represented at 113. Such a starter control system, in its simplest form, commonly consists of a conductor 115 from the other terminal of the motor M to one terminal of a conventional starter switch 117, which may be either an instrument-board push button, or a foot pedal, normally biased to open position by a spring 118. Or this starter switch 117 may be provided with an electromagnetic actuator comprising a solenoid winding 119 which draws an armature 121 for pressing the switch shut through a connector 123. One terminal of such a winding being grounded at 119G and the other terminal of the winding being connected through conductor 124 to the ignition conductor 125, the starter switch in such a system is automatically closed when the ignition switch 127 is closed. In accordance with my invention, the other side of the starter switch 117 connects through a conductor 129 to one of the spaced contacts 27 of my safety switch. (Normally this conductor would go directly to the battery.) From the other spaced contact 27 of my switch a conductor 131 connects to the ungrounded terminal of the battery. My starter safety switch, as shown, is represented in the position for closing the circuit through its contacts 27.

As may be seen, the starter motor circuit cannot be completed when the regular starter switch 117 closes, if my safety switch is held open, and this will be caused by either the gear shifter being away from neutral position or by the engine running and producing a partial vacuum above the diaphragm.

Fig. 7 is also a diagrammatic view showing a different automatic starter system utilizing my starter safety switch without passing the heavy starter motor current therethrough. This is conveniently accomplished by connecting the ungrounded terminal of the starter winding 119 through the conductor 124 to one contact 27 of my safety switch, and connecting the other contact 27 of my switch through a conductor 131 to the ignition wire 125. When my starter safety switch contacts 27 are bridged together, as shown, closing the usual ignition switch 127 causes the starter switch 117 to be closed automatically in the same manner as described with reference to the system of Fig. 6. But if the contacts 27 of my safety switch are held open by the shifter and its actuated cam 51 being in any other position than neutral, or by operation of the engine causing a suction above diaphragm 47, it will be apparent that the winding 119 will not be energized and the starter switch 117 will not be closed.

The control conductors are relatively light wires of small cross-section and easily extended up to the spaced contacts 27 of my safety switch, which also may be smaller because only light current control capacity is required. Otherwise, the operation of the system and the advantages thereof are similar to that previously described.

Figs. 6 and 7 merely illustrate several useful applications of my safety starter switch, by way of example, from which its use in many other types of starter systems will be readily understood.

It is apparent that within the scope of my invention modifications and different arrangements may be made other than herein disclosed, and the present disclosure is illustrative merely, the invention comprehending variations thereof.

What is claimed as the invention is:

1. An automobile safety starter circuit switch comprising, a flexible diaphragm, a casing enclosing and supporting said diaphragm and having one side hermetically sealed over one side of the diaphragm to exclude atmospheric pressure therefrom, a connection fitting on the sealed side of said casing for receiving a conduit connecting into the intake manifold of an automobile engine, a bracket secured to said casing and extending therefrom, the extended portion of said bracket being conformed to engage and be secured upon an automobile steering column and to fit around a rotative steering column type of gear shifter for holding the casing in a predetermined position relative thereto, a mechanical actuator connected to said diaphragm and extending externally from the casing toward such a rotative gear shifter, an electrically insulated bridging contact carried by said mechanical actuator, a pair of electrical contacts, means mounting said pair of contacts in insulated relation spaced on opposite sides of said actuator to be bridged by said bridging contact when the diaphragm is flexed theretoward, and having in combination therewith a cam with raised surfaces suitable for engaging said mechanical actuator and holding said bridging contact away from said pair of contacts, said cam having a depressed area between said raised surfaces for releasing said actuator to bring the bridging contact into engagement with said pair of contacts, said cam having a portion conformed for fitting upon such an adjacent rotative gear shifter, and means for securing said cam to such a gear shifter.

2. An automobile safety starter circuit switch in accordance with claim 1 and further characterized by having slack motion interconnection means between said bracket and said cam to facilitate mounting and to maintain said cam and said mechanical actuator in a predetermined operative relationship.

3. A safety starter switch and valve comprising, a valve body having a fluid flow passage with a valve seat therein, a valve suitably conformed to rest upon said seat to restrict fluid flow in one direction or to lift from the valve seat to permit fluid flow in the other direction, said valve having a slow bleeding passage of a relatively small cross-section and so disposed in the valve that it extends across the valve seat and is not closed by engagement on the valve seat, a flexible diaphragm, a casing holding said diaphragm and sealing one side from atmospheric pressure, an electrical switch operatively coupled with said diaphragm to be opened thereby and adapted to be conveniently connected into a conventional starter circuit of an automobile, said valve body being mounted upon said casing with said fluid flow passage connecting from the sealed space on one side of the diaphragm through said valve, and said valve body being conformed as a fitting for conveniently receiving a connection from the intake manifold of an automobile engine to flex the diaphragm and hold the switch open while the engine is operating and to delay the release of the diaphragm and closing of the switch when the engine ceases to operate.

4. A safety starter switch and valve in accordance with claim 3 and further characterized by said reverse flow passage being a narrow slot in and across the surface of the valve which engages the valve seat.

HENRY W. LINDENMUTH.

REFERENCES CITED

The following references are of record in the file of this patent:

UNITED STATES PATENTS

| Number | Name | Date |
|---|---|---|
| 1,792,583 | Good | Feb. 17, 1931 |
| 1,983,849 | Good | Dec. 11, 1934 |
| 2,021,568 | North et al. | Nov. 19, 1935 |
| 2,117,066 | Liverance | May 10, 1938 |
| 2,167,646 | Dyer | Aug. 1, 1939 |
| 2,267,602 | Claytor | Dec. 23, 1941 |
| 2,289,643 | Furnas et al. | July 14, 1942 |
| 2,302,685 | Dyer | Nov. 24, 1942 |
| 2,324,819 | Butzbach | July 20, 1943 |
| 2,385,881 | Peterson | Oct. 2, 1945 |

FOREIGN PATENTS

| Number | Country | Date |
|---|---|---|
| 372,634 | Great Britain | May 12, 1932 |